(12) United States Patent
Zhu et al.

(10) Patent No.: US 10,880,458 B2
(45) Date of Patent: Dec. 29, 2020

(54) VIDEO IMAGE PROCESSING METHOD AND APPARATUS

(71) Applicant: Tencent Technology (Shenzhen) Company Limited, Guangdong (CN)

(72) Inventors: Xiaolong Zhu, Guangdong (CN); Yitong Wang, Guangdong (CN); Kaining Huang, Guangdong (CN); Lijian Mei, Guangdong (CN); Shenghui Huang, Guangdong (CN); Jingmin Luo, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/677,383

(22) Filed: Nov. 7, 2019

(65) Prior Publication Data

US 2020/0076990 A1 Mar. 5, 2020

Related U.S. Application Data

(63) Continuation of application No. PCT/CN2018/112631, filed on Oct. 30, 2018.

(30) Foreign Application Priority Data

Dec. 8, 2017 (CN) .......................... 2017 1 1294694

(51) Int. Cl.
*H04N 5/21* (2006.01)
*G06K 9/00* (2006.01)
*G06T 5/00* (2006.01)

(52) U.S. Cl.
CPC ........... *H04N 5/21* (2013.01); *G06K 9/00228* (2013.01); *G06K 9/00362* (2013.01);
(Continued)

(58) Field of Classification Search
CPC .. H04N 5/21; G06K 9/00228; G06K 9/00362; G06T 5/002; G06T 2207/10016; G06T 2207/30201
(Continued)

(56) References Cited

U.S. PATENT DOCUMENTS

9,041,864 B2 * 5/2015 Nenonen .................. H04N 5/20
  348/655
9,787,902 B1 10/2017 Beysserie et al.
(Continued)

FOREIGN PATENT DOCUMENTS

CN 105141807 A 12/2015
CN 106780370 A 5/2017

OTHER PUBLICATIONS

International Search Report for PCT Appln. No. PCT/CN2018/112631, dated Jan. 22, 2019, 9 pages, Chinese language.
(Continued)

*Primary Examiner* — Michael Lee
(74) *Attorney, Agent, or Firm* — Brinks Gilson & Lione

(57) ABSTRACT

A video image processing method and apparatus is described. The method includes obtaining a first key point of an $M^{th}$ frame image in a video. The method further includes performing weighted smoothing on the first key point of the $M^{th}$ frame image according to first key points in a historical key point queue and weights in a first target weight queue, to obtain a target key point. The historical key point queue includes a first key point corresponds to each frame image in N frame images. The N frame images are images before the $M^{th}$ frame image, N>0. The weights in the first target weight queue corresponding to the first key points in the historical key point queue, A weight corresponding to a first key point of an $(M-a)^{th}$ frame image being greater than or equal to a weight corresponding to a first key point of an $(M-b)^{th}$ frame image, and a<b. The method further includes adjusting the $M^{th}$ frame image according to the target key point.

16 Claims, 6 Drawing Sheets

(52) U.S. Cl.
CPC .... *G06T 5/002* (2013.01); *G06T 2207/10016* (2013.01); *G06T 2207/30201* (2013.01)

(58) Field of Classification Search
USPC .......................................................... 348/576
See application file for complete search history.

(56) References Cited

U.S. PATENT DOCUMENTS

| | | | |
|---|---|---|---|
| 2007/0002146 A1* | 1/2007 | Tico | G06T 7/277 348/208.1 |
| 2014/0362240 A1* | 12/2014 | Klivington | G06T 5/50 348/208.1 |
| 2015/0256755 A1* | 9/2015 | Wu | G06T 7/277 348/208.6 |
| 2017/0309031 A1 | 10/2017 | Wu | |
| 2018/0063440 A1* | 3/2018 | Kopf | H04N 5/23238 |
| 2018/0359415 A1* | 12/2018 | Liang | H04N 5/23254 |

OTHER PUBLICATIONS

Ryu, Y.G. et al., "Robust Online Digital Image Stabilization Based on Point-Feature Trajectory Without Accumulative Global Motion Estimation," *IEEE Signal Processing Letters*, V19, No. 4, Apr. 30, 2012, pp. 223-226.

* cited by examiner

VIDEO IMAGE PROCESSING METHOD AND APPARATUS

PRIORITY

This application is a continuation of and claims priority to Patent Cooperation Treaty International Application No. PCT/CN2018/112631, filed Oct. 30, 2018, which claims priority to Chinese Patent Application No. 201711294694.4, entitled "VIDEO IMAGE PROCESSING METHOD AND APPARATUS" filed on Dec. 8, 2017, each of which being incorporated by reference in its entirety.

FIELD OF THE TECHNOLOGY

This disclosure relates to a video image processing method and apparatus.

BACKGROUND

In human face key point detection, random jitter may occur between a key point of a previous frame and a key point of a next frame, affecting visual experience of a user. Kalman filtering or optical flow methods may be used to predict a current based on a historical frame. Improvements in the processing speed and efficacy of jitter prevention and correction systems will improve system performance.

SUMMARY

A video image processing method and apparatus is used to prevent video jitter, resolving the technical problems of slow processing speed and poor effect in preventing jitter in the related technology. The techniques and architectures described provide technical solutions to the above described technical problems and other technical problems:

In an example, a video image processing method is provided. The method includes obtaining a first key point of an $M^{th}$ frame image in a video. The method further includes performing weighted smoothing on the first key point of the $M^{th}$ frame image according to first key points in a historical key point queue and weights in a first target weight queue, to obtain a target key point. The historical key point queue including a first key point corresponds to each frame image in N frame images. The N frame images are images before the $M^{th}$ frame image, N>0. The weights in the first target weight queue correspond to the first key points in the historical key point queue, each weight in the first target weight queue being less than or equal to 1. A weight corresponding to a first key point of an $(M-a)^{th}$ frame image is greater than or equal to a weight corresponding to a first key point of an $(M-b)^{th}$ frame image, and a<b. The method further includes adjusting the $M^{th}$ frame image according to the target key point.

In an example, a video image processing apparatus is provided. The apparatus includes an obtaining module, configured to obtain a first key point of an $M^{th}$ frame image in a video. The apparatus includes a smoothing module, configured to perform weighted smoothing on the first key point of the $M^{th}$ frame image according to first key points in a historical key point queue and weights in a first target weight queue, to obtain a target key point. The historical key point queue includes a first key point corresponding to each frame image in N frame images. The N frame images are images before the $M^{th}$ frame image, N>0. The weights in the first target weight queue correspond to the first key points in the historical key point queue, each weight in the first target weight queue being less than or equal to 1. A weight corresponding to a first key point of an $(M-a)^{t}$ frame image is greater than or equal to a weight corresponding to a first key point of an $(M-b)^{th}$ frame image, and a<b. The apparatus further includes an adjustment module, configured to adjust the $M^{th}$ frame image according to the target key point.

In an example, a video image processing apparatus is provided. The apparatus includes a memory and a processor. The memory is configured to store a program. The processor is configured to execute the program in the memory. The program includes obtaining a first key point of an $M^{th}$ frame image in a video. The program further includes performing weighted smoothing on the first key point of the $M^{th}$ frame image according to first key points in a historical key point queue and weights in a first target weight queue, to obtain a target key point. The historical key point queue includes a first key point corresponding to each frame image in N frame images. The N frame images are images before the $M^{th}$ frame image, N>0. The weights in the first target weight queue correspond to the first key points in the historical key point queue, Each weight in the first target weight queue is less than or equal to 1. A weight corresponding to a first key point of an $(M-a)^{th}$ frame image being greater than or equal to a weight corresponding to a first key point of an $(M-b)^{th}$ frame image, and a<b. The program further includes adjusting the $M^{th}$ frame image according to the target key point.

In an example a computer-readable storage medium is provided. The computer-readable storage medium includes instructions. The instructions, when run on a computer, cause the computer to execute the method described above.

In various implementations including those described above, smoothing is performed on a key point of a target frame based on key points of historical frames. The weights are set based on a timing sequence, so that a key point of a historical frame that is closer to the target frame has a larger weight, and a key point of a historical frame that is farther away from the target frame has a smaller weight.

BRIEF DESCRIPTION OF THE DRAWINGS

The accompanying drawings in the following description show some implementations, but other implementations are possible.

DETAILED DESCRIPTION

Hereinafter, the technical solutions in the embodiments of this application are described with reference to the accompanying drawings in the embodiments of this application.

The terms "first", "second", "third", "fourth", and the like (if any) are used for distinguishing similar objects, and are not necessarily used for describing a particular sequence or order. It is to be understood that, data used in this way is interchangeable in a proper case, so that the techniques and architectures that are described herein can be implemented in another order different from the order shown or described herein. For example, a process, method, system, product, or device that includes a list of operations or units is not necessarily limited to the operations or units expressly listed, but may include other operations or units not expressly listed or inherent to such the process, method, system, product, or device.

The described techniques and architectures provide a video image processing method and apparatus, to improve the processing speed of video jitter prevention, improve the effect in preventing video jitter, and improve the user experience.

Human face key point: The human face key point is a key feature point of a human face, for example, contour points of various parts of a human face such as eyes, tip of a nose, points of corners of a mouth, and eyebrows. A human face key point of an image specifically refers to a coordinate point corresponding to a key feature point of a human face in the image.

Human body posture key point: The human body posture key point is a key feature point for determining an orientation of a human body posture, and is essentially interpreted as a key feature point of a human body action, for example, points corresponding to various parts of a human body such as eyes, tip of a nose, wrists, ankles, and an abdomen. A human body posture key point of an image specifically refers to a coordinate point corresponding to a key feature point of a human body posture in the image.

For the purpose of illustration, the following briefly introduces scenarios to which the video image processing is applicable.

1. Video Shooting Scenario.

Figure 1:
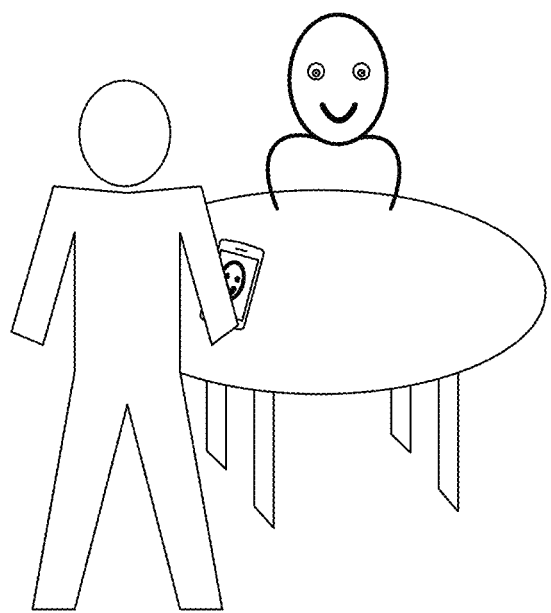
FIG. 1 is a schematic diagram of a scenario to which a video image processing method and apparatus is applicable.
Figure 2:
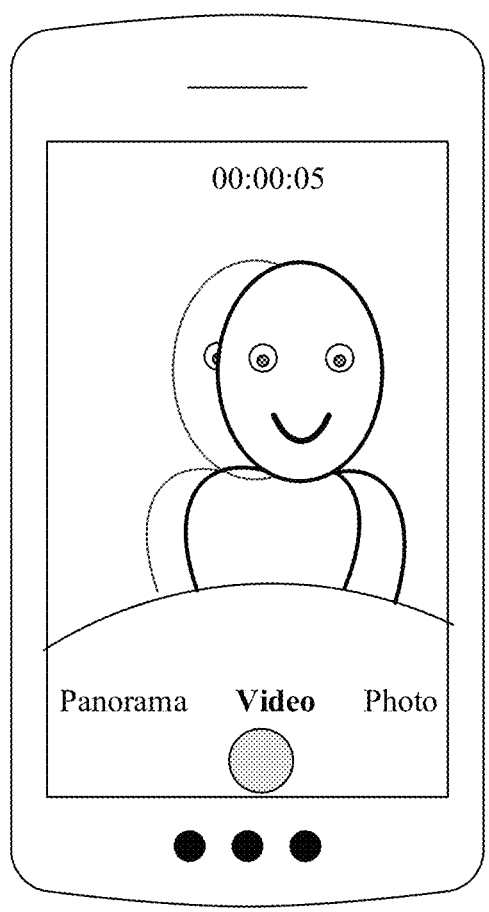
FIG. 2 is a visual schematic diagram of jitter occurring during video shooting.

As shown in FIG. 1, in a case that a user takes a video at a target person through a camera of a mobile phone, the video taken by the camera is displayed on a screen of the mobile phone. However, the mobile phone is not necessarily static during the shooting process. Therefore a human body posture key point corresponding to the target person jitters in each frame image, as shown in FIG. 2. To avoid jitter, the mobile phone can perform smoothing on the human body posture key point in a current video frame by using the video image processing techniques described herein The techniques may be used to display a processed video frame on the screen in real time, so that the user does not perceive picture jitter visually.

2. Video Processing Scenario.

During playback of a video taken by a user or a video downloaded from the Internet and other devices, the user may see jitter due to poor quality of the video. A mobile phone or a computer processes each frame image in the video by using the video image processing techniques, and replaces an original video frame with a processed video frame, so that the user does not perceive picture jitter visually when watching the video.

The video image processing techniques may be applied to a mobile terminal such as a mobile phone or a computer or a fixed terminal, which may be referred to as a video image processing apparatus herein. In addition to the foregoing scenarios, the video image processing techniques may further be applied to other scenarios.

Figure 3:
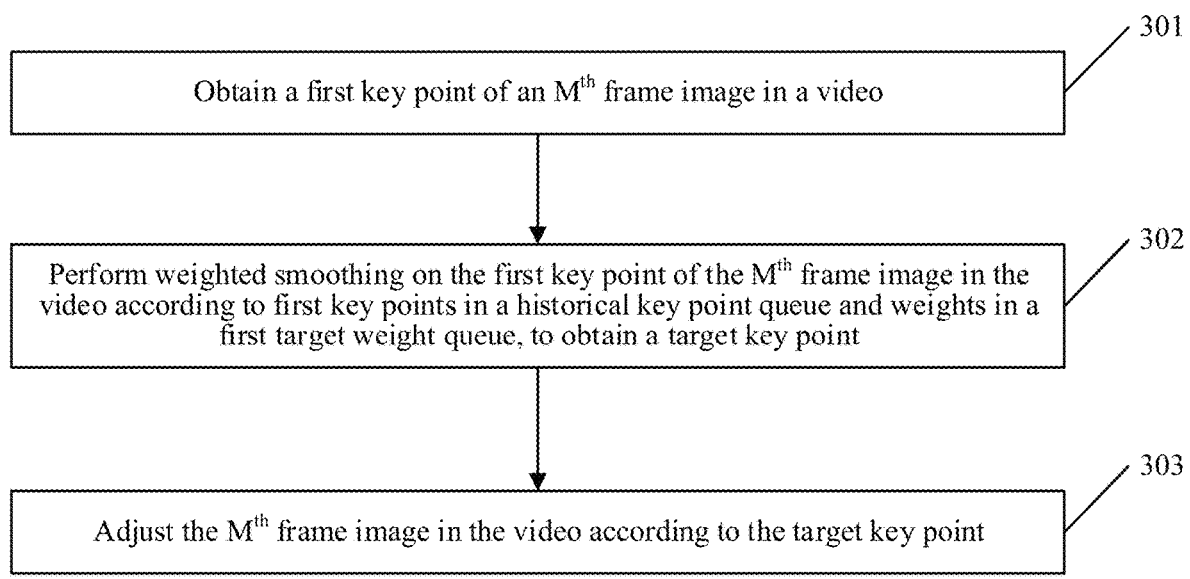
FIG. 3 is a schematic diagram of an example of a video image processing method.

Based on the above scenarios and apparatus structures, the following introduces the video image processing method. Referring to FIG. 3, an example of the video image processing method is shown A video processing apparatus obtains a first key point of an $M^{th}$ frame image in a video (301). M is greater than an integer of N, and N is greater than an integer of 0. The video processing apparatus determines a first weight queue as a first target weight queue (302).

The video processing apparatus determines the first weight queue, and uses the first weight queue as the first target weight queue. This step may be performed after step 301, or may be performed before step 301, or may be performed with step 301 together.

The video processing apparatus performs weighted smoothing on the first key point of the $M^{th}$ frame image in the video according to first key points in a historical key point queue and weights in the first target weight queue, to obtain a target key point (303).

The historical key point queue includes a first key point corresponding to each frame image in N frame images. The N frame images are images before the $M^{th}$ frame image. The weights in the first target weight queue correspond to the first key points in the historical key point queue. Each weight in the first target weight queue is less than or equal to 1. A weight corresponding to a first key point of an $(M-a)^{th}$ frame image is greater than or equal to a weight corresponding to a first key point of an $(M-b)^{th}$ frame image, and $0<a<b\leq N$. That is, a first key point in an image that is closer to the $M^{th}$ frame image in a timing sequence corresponds to a larger weight, and a first key point in an image that is farther away from the $M^{th}$ frame image in the timing sequence corresponds to a smaller weight.

The video processing apparatus adjusts the $M^{th}$ frame image in the video according to the target key point (304).

The video image processing apparatus performs weighted smoothing on the first key point to obtain the target key point, and then adjusts the $M^{th}$ frame image in the video according to a key point obtained after smoothing, that is, the target key point.

In various implementations, the video image processing apparatus can obtain a first key point of an $M^{th}$ frame image in a video, perform smoothing on the first key point of the $M^{th}$ frame image according to first key points in a historical key point queue and weights corresponding to such key points, and adjust the $M^{th}$ frame image according to a target key point obtained by after smoothing. The historical key point queue includes first key points corresponding to N frame images before the $M^{th}$ frame image. A weight corresponding to a first key point of an $(M-a)^{th}$ frame image is greater than or equal to a weight corresponding to a first key point of an $(M-b)^{th}$ frame image, and $0\leq a<b$. That is, in some cases, smoothing is performed on a key point of a target frame based on key points of historical frames, and weights are set according to a timing sequence, so that a key point of a historical frame that is closer to the target frame has a larger weight, and a key point of a historical frame that is farther away from the target frame has a smaller weight.

Figure 4:
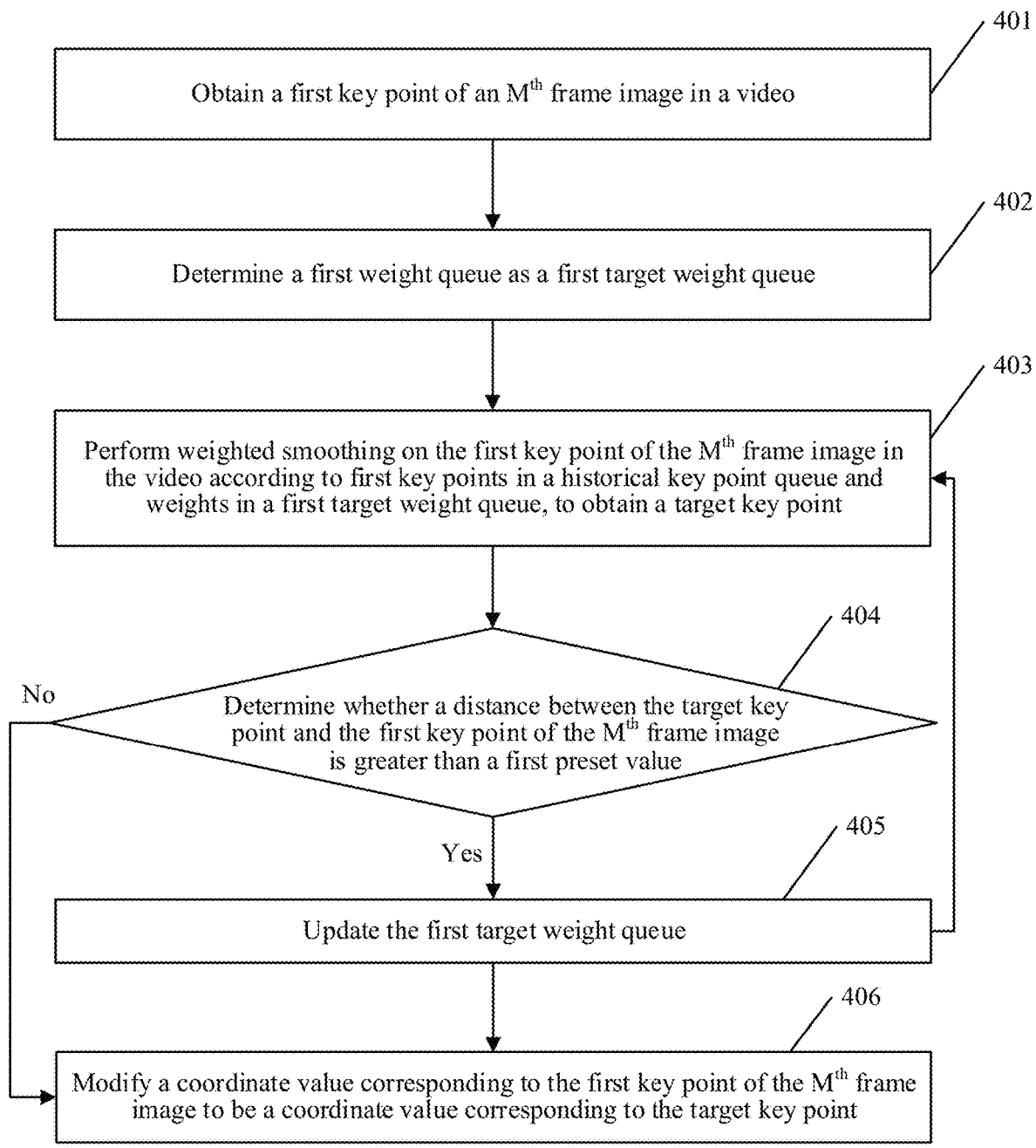
FIG. 4 is a schematic diagram of another example of a video image processing method.

Referring to FIG. 4, another example of the video image processing method is shown.

A video processing apparatus obtains a first key point of an $M^{th}$ frame image in a video (401).

The video processing apparatus obtains the $M^{th}$ frame image, and detects the first key point in the image. In various implementations, the first key point refers to a key point of a specific type of feature, for example, a human face key point, or a human body posture key point. In a possible implementation, the video processing apparatus may detect the human face key point or the human body posture key point by using a deep neural network method, or may detect the human face key point or the human body posture key point by using another related technology.

The video processing apparatus determines a first weight queue as a first target weight queue (402).

This step may be performed after step 401, or may be performed before step 401, or may be performed with step 401 together.

The first weight queue includes a weight corresponding to a first key point of each frame image in N frame images, where the N frame images are images before the $M^{th}$ frame image. The first weight queue may be set for different first key points by the video processing apparatus according to empirical values. That is, a preset weight queue is determined as the first target weight queue. The first weight queue may also be obtained by the video processing apparatus by updating a weight queue configured to calculate an $(M-1)^{th}$ frame image. That is, an updated weight queue is determined as the first target weight queue.

The video processing apparatus performs weighted smoothing on the first key point of the $M^{th}$ frame image in the video according to first key points in a historical key point queue and weights in a first target weight queue, to obtain a target key point (403).

The historical key point queue includes a first key point corresponding to each frame image in N frame images. The weights in the first target weight queue correspond to the first key points in the historical key point queue. Each weight in the first target weight queue is less than or equal to 1. A weight corresponding to a first key point of an $(M-a)^{th}$ frame image is greater than or equal to a weight corresponding to a first key point of an $(M-b)^{th}$ frame image, and $0<a\leq b$ N. That is, a first key point of an image that is closer to the $M^{th}$ frame image in a timing sequence corresponds to a larger weight, and a first key point of an image that is farther away from the $M^{th}$ frame image in the timing sequence corresponds to a smaller weight.

In a possible implementation, the video image processing apparatus may perform weighted smoothing on the first key point $p_{before}$ of the $M^{th}$ frame image according to the following formula, to obtain the target key point $p_{after}$:

$$p_{after} = \frac{p_{before} + \sum_{j=1}^{N} w_j p_j}{1 + \sum_{j=1}^{N} w_j},$$

where N represents a length of the historical key point queue, $p_j$ represents a first key point of an $(M-j)^{th}$ frame image, and $w_j$ represents a weight corresponding to $p_j$ (that is, a weight corresponding to the first key point of the $(M-j)^{th}$ frame image).

In various implementations, the $M^{th}$ frame image may have one first key point or a plurality of first key points. In a case that the $M^{th}$ frame image has one first key point, the video image processing apparatus performs weighted smoothing on the first key point of the $M^{th}$ frame image to obtain one target key point. In a case that the $M^{th}$ frame image has a plurality of first key points, for each first key point of the $M^{th}$ frame image, the video image processing apparatus calculates a target key point corresponding to each first key point by using the formula above, to obtain a plurality of target key points.

The video processing apparatus determines whether a distance between the target key point and the first key point of the $M^{th}$ frame image is greater than a first preset value, performs step 405 in a case that the distance is greater than the first preset value, and performs step 406 in a case that the distance is not greater than the first preset value (404).

After performing weighted smoothing on the first key point of the $M^{th}$ frame image, the video image processing apparatus determines whether a distance between the key point before weighted smoothing and the key point after weighted smoothing is greater than the first preset value. That is, the system determines whether a distance between the target key point and the first key point of the $M^{th}$ frame image is greater than the first preset value. In a case that the distance is greater than the first preset value, step 405 is performed, and in a case that the distance is not greater than the first preset value, step 406 is performed.

The video processing apparatus updates the first target weight queue, and performs step 403 and step 404 (405).

In a possible implementation, the video image processing apparatus may update the first target weight queue in the following manner: subtracting an attenuation coefficient from each weight in the first weight queue to obtain a second weight queue, so that each weight in the second weight queue is less than a second preset value; and then using the second weight queue as an updated first target weight queue.

The attenuation coefficient is $\alpha=x-y$, where x represents a maximum weight value in the first weight queue, in other words, x represents a weight at the end of the first weight queue, that is, a previous weight that is added to the weight queue; and y represents the second preset value. Thus, it can be ensured that each weight in the second weight queue is less than the second preset value. The second preset value is less than 1, and may specifically be 0.5 or 0.4, or may be other values.

The video image processing apparatus may also update the first target weight queue in the following manner: the video image processing apparatus randomly generates a second weight queue, where each weight in the second weight queue is less than the second preset value, and then uses the second weight queue as an updated first target weight queue.

The video processing apparatus modifies a coordinate value corresponding to the first key point of the $M^{th}$ frame image to be a coordinate value corresponding to the target key point (406).

In a case that the video processing apparatus determines that the distance between the target key point and the first key point of the $M^{th}$ frame image is not greater than the first preset value, the video processing apparatus outputs the target key point, and modifies a coordinate value corresponding to the first key point of the $M^{th}$ frame image to be a coordinate value corresponding to the target key point, that is, reconstructs the first key point of the $M^{th}$ frame image.

In various implementations, when determining that the distance between the target key point and the first key point of the $M^{th}$ frame image is not greater than the first preset value, the video image processing apparatus may further add a gain coefficient to a weight corresponding to a first key point of an (M-1)th frame image in the first target weight queue, to obtain a target weight corresponding to the first key point of the $M^{th}$ frame image.

In a case that the target weight is greater than or equal to 1, a weight corresponding to a first key point of an $(M-N)^{th}$ frame image is deleted from the first target weight queue and the target weight is added to the first target weight queue to obtain a second target weight queue. Then the gain coefficient is subtracted from each weight in the second target weight queue, to obtain a third target weight queue, the third target weight queue being configured to perform weighted smoothing on a first key point of an $(M+1)^t$ frame image.

In a case that the target weight is less than 1, the weight corresponding to the first key point of the $(M-N)^{th}$ frame image is deleted from the first target weight queue and the target weight is added to the first target weight queue, to obtain the second target weight queue. The second target weight queue may be configured to perform weighted smoothing on a first key point of an $(M+1)^{th}$ frame image.

In various implementations, a value of the gain coefficient is small, and may specifically be 0.1, 0.05, or the like. First, it is to be noted that, the above two branches are for the case in which a length of the first target weight queue is equal to a target threshold. In a case that the length of the first target weight queue is less than the target threshold, the target weight may be directly added to the first target weight queue, to obtain the second target weight queue. A value of the target threshold may be 5, but other value are possible.

Secondly, it is to be noted that, the video image processing apparatus may also update the historical key point. In the case that a length of the historical key point queue is less than a target threshold, the first key point of the $M^{th}$ frame image is added to the historical key point queue, to obtain an updated historical key point queue, In the case that the length of the historical key point queue is equal to the target threshold, the first key point of the $(M-N)^{th}$ frame image is deleted from the historical key point queue. The first key point of the $M^{th}$ frame image is added to the historical key point queue, to obtain an updated historical key point queue.

In various implementations, the video image processing apparatus can obtain a first key point of an $M^{th}$ frame image in a video, perform smoothing on the first key point of the $M^{th}$ frame image according to first key points in a historical key point queue and weights corresponding to such key points, and adjust the $M^{th}$ frame image according to a target key point obtained after smoothing. The historical key point queue includes first key points corresponding to N frame images before the $M^{th}$ frame image, a weight corresponding to a first key point of an $(M-a)^{th}$ frame image is greater than or equal to a weight corresponding to a first key point of an $(M-b)^{th}$ frame image, and $0 \leq a < b \leq N$. That is, in various implementations, smoothing is performed on a key point of a target frame according to key points of historical frames, and weights are set according to a timing sequence, so that a key point of a historical frame that is closer to the target frame has a larger weight, and a key point of a historical frame that is farther away from the target frame has a smaller weight.

In addition, the video image processing apparatus may determine a distance between a key point before smoothing and a key point after smoothing. In the case that the distance between a key point before smoothing and a key point after smoothing is large relative to other key distances, the video image processing apparatus may attenuate the first target weight queue, thus avoiding a case in which the key point cannot be tracked or an offset is excessively large.

In some implementations, the $M^{th}$ frame image includes a plurality of first key points, and the video image processing apparatus may reconstruct all the first key points in the $M^{th}$ frame image by performing steps 401 to 406 above, to complete the adjustment of the $M^{th}$ frame image.

In some implementations, the $M^{th}$ frame image includes a plurality of first key points. After performing weighted smoothing on each first key point in the $M^{th}$ frame image by using the method described in step 403 above to obtain a corresponding target key point, the video image processing apparatus calculates a distance between each first key point in the $M^{th}$ frame image and the corresponding target key point, and then calculates an average value of the plurality of distances (an average distance). In a case that the average value is not greater than the first preset value, a coordinate value corresponding to each first key point of the $M^{th}$ frame image is modified to be a coordinate value corresponding to the target key point, to complete the adjustment of the $M^{th}$ frame image. In a case that the average value is greater than the first preset value, the first target weight queue is updated by performing step 405 above, and the steps described above are performed again (that is, steps of calculating the target key point, calculating the average value, and determining whether the average value is greater than the first preset value).

In an illustrative example scenario, a user takes a video of a face of a target person by using a mobile phone. The video processing apparatus obtains human face key points of a first frame image of the video: a left eye key point (1, 5), a right eye key point (5, 5), and a mouth key point (3, 3). In this case, a historical key point queue is empty, and the video processing apparatus adds the human face key points of the first frame image to the historical frame key point queue, and determines that weights corresponding to the left eye key point, the right eye key point, and the mouth key point in the first frame image are 0.7 according to a preset empirical value.

The video processing apparatus obtains human face key points of a second frame image: a left eye key point (1, 6), a right eye key point (5, 6), and a mouth key point (3, 2). In this case, a length of the historical key point queue is less than a preset length 3, the human face key points of the second frame image are added to a historical keyword queue, and it is determined that weights corresponding to the left eye key point, the right eye key point, and the mouth key point of the second frame image are 0.8 according to the preset empirical value.

The video processing apparatus obtains human face key points of a third frame image: a left eye key point (1, 5), a right eye key point (5, 5), and a mouth key point (3, 2). In this case, the length of the historical key point queue is less than the preset length 3, the human face key points of the third frame image are added to the historical keyword queue, and it is determined that weights corresponding to the left eye key point, the right eye key point, and the mouth key point of the third frame image are 0.9 according to the preset empirical value.

The video processing apparatus obtains human face key points of a fourth frame image: a left eye key point (1, 5), a right eye key point (5, 6), and a mouth key point (3, 3). In this case, the length of the historical key point queue is equal to the preset length 3, and the video processing apparatus determines that $\{0.7, 0.8, 0.9\}$ (a first weight queue) is a first target weight queue. The video processing apparatus performs weighted smoothing on the human face key points of the fourth frame image according to the key points in the historical key point queue $$\left\{\begin{matrix} (1, 5) & (1, 6) & (1, 5) \\ (5, 5) & (5, 6) & (5, 5) \\ (3, 3) & (3, 2) & (3, 2) \end{matrix}\right\}$$

and the first target weight queue $\{0.7, 0.8, 0.9\}$.

In a possible implementation, the video image processing apparatus performs weighted averaging on weights corresponding to the left eye key points of the first frame image to the third frame image, to obtain a target key point corresponding to the left eye key point (1, 5) of the fourth frame image:

$$P_{after1} = \left(\frac{1+(1*0.9+1*0.8+1*0.7)}{1+0.9+0.8+0.7}, \frac{5+(5*0.9+6*0.8+5*0.7)}{1+0.9+0.8+0.7}\right) = (1, 5.2);$$

the video image processing apparatus performs weighted averaging on weights corresponding to the right eye key points of the first frame to the third frame image, to obtain a target key point corresponding to the right eye key point (5, 6) of the fourth frame image:

$$P_{after2} = \left(\frac{5+(5*0.9+5*0.8+5*0.7)}{1+0.9+0.8+0.7}, \frac{6+(5*0.9+6*0.8+5*0.7)}{1+0.9+0.8+0.7}\right) = (5, 5.5);$$

the video image processing apparatus performs weighted averaging on weights corresponding to the mouth key points of the first frame to the third frame image, to obtain a target key point corresponding to the mouth key point (3, 3) of the fourth frame image $$P_{after3} = \left(\frac{3+(3*0.9+3*0.8+3*0.7)}{1+0.9+0.8+0.7}, \frac{3+(2*0.9+2*0.8+3*0.7)}{1+0.9+0.8+0.7}\right) = (3, 2.5)$$

The video image processing apparatus calculates that a distance between the left eye key point (1, 5) and the corresponding target key point (1, 5.2) is 0.2, a distance between the right eye key point (5, 6) and the corresponding target key point (5, 5.5) is 0.5, and a distance between the mouth key point (3, 3) and the corresponding target key point (3, 2.5) is 0.5. An average value of distances between the key points before smoothing and the key points after smoothing is (0.2+0.5+0.5)/3=0.4. The average value is not greater than the first preset value (which is, for example, 10), so that for each human face key point of the fourth frame image, the video image processing apparatus modifies a coordinate value of the human face key point to be a coordinate value obtained after smoothing. That is, the system modifies a coordinate value of the left eye key point of the fourth frame image to be (1, 5.2), modifies a coordinate value of the right eye key point of the fourth frame image to be (5, 5.5), and modifies a coordinate value of the mouth key point of the fourth frame image to be (3, 2.5).

During the adjustment of the fourth frame image, the video image processing apparatus further updates the historical key point queue to $$\left\{\begin{matrix}(1,6) & (1,5) & (1,5)\\(5,6) & (5,5) & (5,6)\\(3,2) & (3,2) & (3,3)\end{matrix}\right\},$$

and adds a gain coefficient 0.1 to the weight 0.9 corresponding to the third frame image in the first target weight queue to obtain a target weight 1, and the target weight is equal to 1. Then, the video image processing apparatus deletes the weight 0.7 corresponding to the first frame image from the first target weight queue {0.7,0.8,0.9}, and adds the target weight 1 corresponding to the fourth frame image to obtain a second target weight queue {0.8,0.9,1}, and subtracts a gain coefficient 0.1 from each weight in the second target weight queue, to obtain a third target weight queue {0.7, 0.8,0.9}, where 0.7 is a weight corresponding to the human face key point of the second frame image, 0.8 is a weight corresponding to the human face key point of the third frame image, and 0.9 is a weight corresponding to the human face key point of the fourth frame image.

Figure 5:
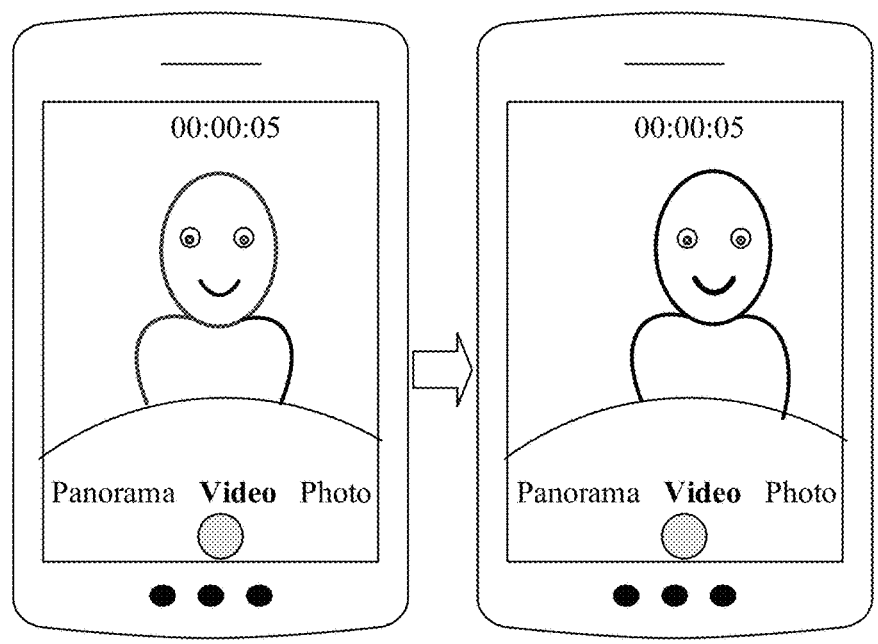
FIG. 5 is a schematic diagram of a visual effect presented by a mobile phone in a case that a user takes a video.

According to an updated historical key point queue $$\left\{\begin{matrix}(1,6) & (1,5) & (1,5)\\(5,6) & (5,5) & (5,6)\\(3,2) & (3,2) & (3,3)\end{matrix}\right\}$$

and the third target weight queue {0.7,0.8,0.9}, the fifth frame image is adjusted by using the method described above, and each frame image is adjusted in this way. A post-processing effect is shown in FIG. 5.

In various implementations, the video image processing apparatus detects the human face key point of each frame image. In a case that the human face key point of one frame image is not detected, the video image processing apparatus empties the current historical key point queue and the current weight queue.

Figure 6:
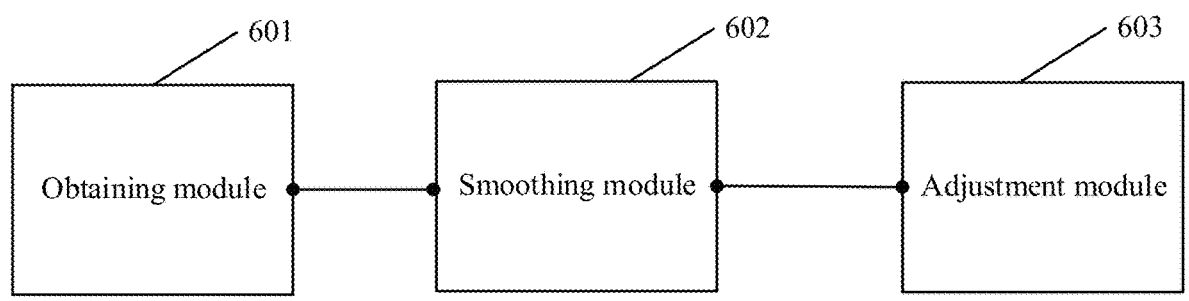
FIG. 6 is a schematic diagram of an example of a video image processing apparatus.

The foregoing introduces the video image processing method in various implementations and the following introduces the video image processing apparatus in the in various implementations. Referring to FIG. 6, an example video image processing apparatus is shown. The video processing apparatus includes an obtaining module 601, configured to obtain a first key point of an $M^{th}$ frame image in a video.

The video processing apparatus further includes a smoothing module 602, configured to perform weighted smoothing on the first key point of the $M^{th}$ frame image according to first key points in a historical key point queue and weights in a first target weight queue, to obtain a target key point. The historical key point queue includes a first key point corresponding to each frame image in N frame images, The N frame images are images before the $M^{th}$ frame image, N>0, The weights in the first target weight queue corresponding to the first key points in the historical key point queue. Rach weight in the first target weight queue is less than or equal to 1, a weight corresponding to a first key point of an $(M-a)^{th}$ frame image being greater than or equal to a weight corresponding to a first key point of an $(M-b)^{th}$ frame image, and 0≤a<b≤N.

The video processing apparatus further includes an adjustment module 603, configured to adjust the $M^{th}$ frame image according to the target key point.

For an example process executed by each module of the example video image processing apparatus corresponding to FIG. 6, refer to the process in the example method of FIG. 3.

In various implementation, the obtaining module 601 can obtain a first key point of an $M^{th}$ frame image in a video. The smoothing module 602 performs smoothing on the first key point of the $M^{th}$ frame image according to first key points in a historical key point queue and weights corresponding to such key points. The adjustment module 603 adjusts the $M^{th}$ frame image according to a target key point obtained by smoothing. The historical key point queue includes first key points corresponding to N frame images before the $M^{th}$ frame image. A weight corresponding to a first key point of an $(M-a)^{th}$ frame image is greater than or equal to a weight corresponding to a first key point of an $(M-b)^{th}$ frame image, and $0 \leq a < b \leq N$. That is, in various implementations, smoothing is performed on a key point of a target frame according to key points of historical frames. The weights are set based on a timing sequence, so that a key point of a historical frame that is closer to the target frame has a larger weight, and a key point of a historical frame that is farther away from the target frame has a smaller weight.

Figure 7:
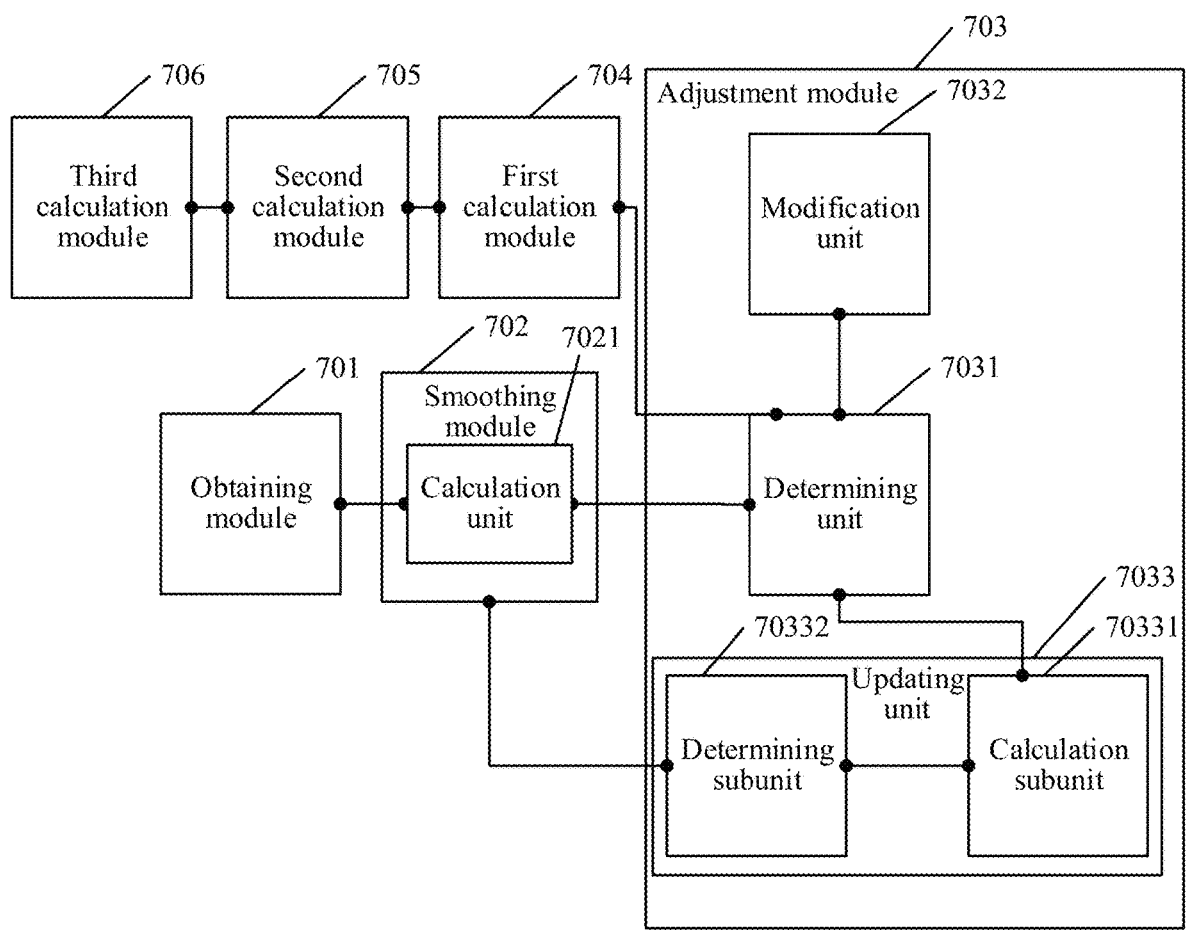
FIG. 7 is a schematic diagram of an example of a video image processing apparatus.

Referring to FIG. 7, another example of the video image processing apparatus is shown.

The apparatus includes an obtaining module 701 configured to obtain a first key point of an $M^{th}$ frame image in a video The apparatus further includes a smoothing module 702, configured to perform weighted smoothing on the first key point of the $M^{th}$ frame image according to first key points in a historical key point queue and weights in a first target weight queue, to obtain a target key point. The historical key point queue including a first key point corresponds to each frame image in N frame images, the N frame images being images before the $M^{th}$ frame image, N>0. The weights in the first target weight queue correspond to the first key points in the historical key point queue. Each weight in the first target weight queue is less than or equal to 1, a weight corresponding to a first key point of an $(M-a)^{th}$ frame image being greater than or equal to a weight corresponding to a first key point of an $(M-b)^{th}$ frame image, and $0 \leq a < b \leq N$.

The apparatus further includes an adjustment module 703 configured to adjust the $M^{th}$ frame image according to the target key point.

In a possible implementation, the adjustment module 703 further includes a determining unit 7031, configured to determine whether a distance between the target key point and the first key point of the $M^{th}$ frame image is greater than a first preset value; and The adjustment module further includes a modification unit 7032, configured to modify a coordinate value corresponding to the first key point of the $M^{th}$ frame image to be a coordinate value corresponding to the target key point in a case that the determining unit determines that the distance is not greater than the first preset value.

In a possible implementation, the adjustment module 703 further includes:

The apparatus further includes an updating unit 7033, configured to update the first target weight queue and trigger the smoothing module 702 in a case that the determining unit 7031 determines that the distance is greater than the first preset value.

In a possible implementation, the updating unit 7033 includes a calculation subunit 70331 configured to subtract an attenuation coefficient from each weight in the first weight queue, and to obtain a second weight queue, so that each weight in the second weight queue is less than a second preset value. The updating unit further includes a determining subunit 70332, configured to use the second weight queue as an updated first target weight queue.

In a possible implementation, the apparatus may further include a first calculation module 704, configured to add a gain coefficient to a weight corresponding to a first key point of an $(M-1)^{th}$ frame image in the first target weight queue in a case that the determining unit 7031 determines that the distance is not greater than the first preset value, to obtain a target weight, the target weight corresponding to the first key point of the $M^{th}$ frame image. The apparatus may further include a second calculation module 705, configured to delete a weight corresponding to a first key point of an $(M-N)^t$ frame image from the first target weight queue and add the target weight to the first target weight queue to obtain a second target weight queue in a case that the target weight calculated by the first calculation module is greater than or equal to 1. The second calculation module may be further configured to subtract the gain coefficient from each weight in the second target weight queue to obtain a third target weight queue, the third target weight queue being configured to perform weighted smoothing on a first key point of an $(M+1)^{th}$ frame image.

In a possible implementation, the apparatus may further include a third calculation module 706, configured to delete the weight corresponding to the first key point of the $(M-N)^{th}$ frame image from the first target weight queue and add the target weight to the first target weight queue to obtain the second target weight queue in a case that the target weight calculated by the first calculation module is less than 1, the second target weight queue being configured to perform weighted smoothing on the first key point of the $(M+1)^{th}$ frame image.

In a possible implementation, the smoothing module 702 may include a calculation unit 7021, configured to perform weighted averaging on the first key point $p_{before}$ of the $M^{th}$ frame image according to the following formula, to obtain a target key point $p_{after}$:

$$p_{after} = \frac{p_{before} + \sum_{j=1}^{N} w_j p_j}{1 + \sum_{j=1}^{N} w_j},$$

where N represents a length of the historical key point queue, $p_j$ represents a first key point of an $(M-j)^{th}$ frame image, and $w_j$ represents a weight corresponding to $p_j$.

In a possible implementation, the first key point includes a human body posture key point or a human face key point.

For a process executed by the video image processing apparatus corresponding to FIG. 7, refer the method embodiment corresponding to FIG. 4.

In various implementations, the obtaining module 701 can obtain a first key point of an $M^{th}$ frame image in a video. The smoothing module 702 performs smoothing on the first key point of the $M^{th}$ frame image according to first key points in a historical key point queue and weights corresponding to such key points. The adjustment module 704 adjusts the $M^{th}$ frame image according to a target key point obtained by smoothing, where the historical key point queue includes first key points corresponding to N frame images before the $M^{th}$ frame image. A weight corresponding to a first key point of an $(M-a)^{th}$ frame image is greater than or equal to a weight corresponding to a first key point of an $(M-b)^{th}$ frame image, and $0 \leq a < b \leq N$. That is, smoothing is performed on a key point of a target frame according to key points of historical frames, and weights are set based on a timing sequence, so that a key point of a historical frame that is closer to the target frame has a larger weight, and a key point of a historical frame that is farther away from the target frame has a smaller weight.

In addition, the determining unit 7031 may determine a distance between a key point before smoothing and a key point after smoothing. In the case that the distance between a key point before smoothing and a key point after smoothing is large, the updating unit 7033 may attenuate the first target weight queue, avoiding a case in which the key point cannot be tracked or an offset is large.

The video image processing apparatus may be implemented in virtually any computer device. For example, the computer device may be a mobile terminal that can take a video, or other devices capable of processing a video.

Figure 8:
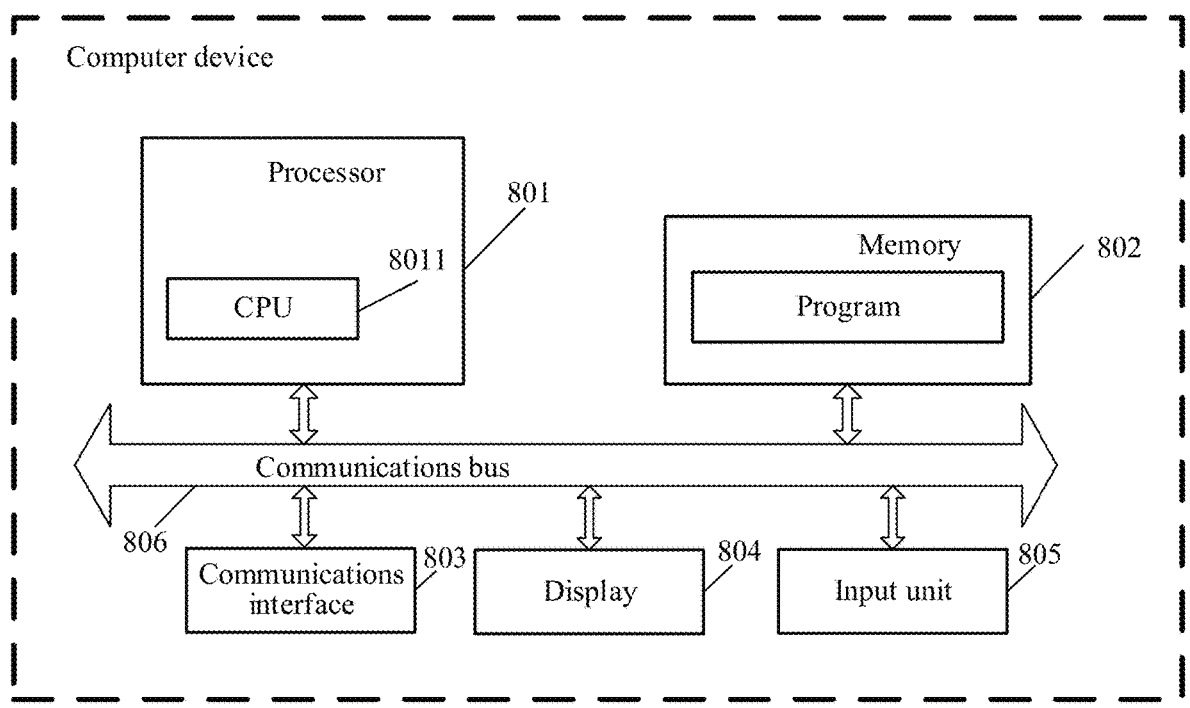
FIG. 8 is a schematic diagram of an example of a video image processing apparatus according to an embodiment of this application.

FIG. 8 is a schematic structural diagram of na example video image processing apparatus. In FIG. 8, the computer device may include: a processor 801, a memory 802, a communications interface 803, a display 804, an input unit 805, and a communications bus 806.

The processor 801, the memory 802, the communications interface 803, the display 804, and the input unit 805 communicate with each other by the communications bus 806.

In various implementations, the processor 801 may include a central processing unit (CPU) 8011. The CPU may be configured obtain a first key point of an $M^{th}$ frame image in a video.

The CPU may further be configured to perform weighted smoothing on the first key point of the $M^{th}$ frame image according to first key points in a historical key point queue and weights in a first target weight queue, to obtain a target key point. The historical key point queue including a first key point corresponds to each frame image in N frame images. The N frame images being images before the $M^{th}$ frame image, N>0. The weights in the first target weight queue correspond to the first key points in the historical key point queue. A weight corresponding to a first key point of an $(M-a)^{th}$ frame image being greater than or equal to a weight corresponding to a first key point of an $(M-b)^{th}$ frame image, and $0 \leq a < b \leq N$.

The CPU may further be configured to adjust the $M^{th}$ frame image according to the target key point.

In a possible implementation, the CPU may further be configured to determine whether a distance between the target key point and the first key point of the $M^{th}$ frame image is greater than a first preset value. The CPU may further be configured to modify a coordinate value corresponding to the first key point of the $M^{th}$ frame image to be a coordinate value corresponding to the target key point in a case that the distance is not greater than the first preset value.

In a possible implementation, the CPU may further be configured to updating the first target weight queue and performing operations (2) and (3) in a case that the distance is greater than the first preset value.

In a possible implementation, the CPU may further be configured to subtracting an attenuation coefficient from each weight in the first weight queue, to obtain a second weight queue, so that each weight in the second weight queue is less than a second preset value. The CPU may further be configured to using the second weight queue as an updated first target weight queue.

In a possible implementation, in the case that it is determined that the distance between the target key point and the first key point of the $M^{th}$ frame image is not greater than the first preset value, the CPU may add a gain coefficient to a weight corresponding to a first key point of an $(M-1)^{th}$ frame image in the first target weight queue, to obtain a target weight, the target weight corresponding to the first key point of the $M^{th}$ frame image. In the above describe case, the CPU may further delete a weight corresponding to a first key point of an $(M-N)^{th}$ frame image from the first target weight queue and adding the target weight to the first target weight queue to obtain a second target weight queue in a case that the target weight is greater than or equal to 1. In the above describe case, the CPU may further subtract the gain coefficient from each weight in the second target weight queue, to obtain a third target weight queue, the third target weight queue being configured to perform weighted smoothing on a first key point of an $(M+1)^{th}$ frame image.

In a possible implementation, the CPU may further be configured to delete the weight corresponding to the first key point of the $(M-N)^{th}$ frame image from the first target weight queue and adding the target weight to the first target weight queue to obtain the second target weight queue in a case that the target weight is less than 1. The second target weight queue is configured to perform weighted smoothing on the first key point of the $(M+1)^{th}$ frame image.

In a possible implementation, the CPU may further be configured to performing weighted averaging on the first key point $p_{before}$ of the $M^{th}$ frame image according to the following formula, to obtain a target key point $p_{after}$:

$$p_{after} = \frac{p_{before} + \sum_{j=1}^{N} w_j p_j}{1 + \sum_{j=1}^{N} w_j},$$

where N represents a length of the historical key point queue, $p_j$ represents a first key point of an $(M-j)^{th}$ frame image, and $w_j$ represents a weight corresponding to $p_j$.

In various implementations, the central processing unit may be implemented using with an application-specific integrated circuit (ASIC), a digital signal processor (DSP), an application-specific integrated circuit (ASIC), a field programmable gate array (FPGA), or another programmable logic device.

The memory 802 is configured to store one or more programs, and the programs may include program code including computer operation instructions. The memory may include a high-speed RAM memory, and may also include a non-volatile memory such as at least one magnetic disk memory.

The communications interface 803 may be an interface of a communications module, for example, an interface of a GSM module.

The display 804 may be used to display an adjusted image. The display can also display information entered by a user or provided to a user and various graphic user interfaces of a computer device. These graphic user interfaces may include various combinations of graphics, text, pictures, and the like. The display may include a display panel, for example, may be a display panel configured in the form of a liquid crystal display, an organic light-emitting diode, or the like. Further, the display may include a touch display panel capable of collecting touch events.

The input unit 805 may be configured to receive information such as characters and numbers entered by the user, and to generate signal input related to user settings and function control. The input unit may include, but is not limited to, one or more of a physical keyboard, a mouse, a joystick, and the like.

In various other practical applications, the computer device may include more components or fewer components than those shown in FIG. 8, or some components may be combined.

Various implementations may use a computer-readable storage medium. The computer-readable storage medium is configured to store computer operation instructions used by the video image processing apparatus above, and may be configured to execute programs designed for the video image processing apparatus.

The video image processing apparatus may be the video image processing apparatus as described above with reference to FIG. 3 to FIG. 8.

For the purpose of convenient and brief description, for a detailed working process of the foregoing system, apparatus, and unit, reference may be made to a corresponding process in the foregoing method embodiments, and details are not described herein again.

It is to be understood that the disclosed system, apparatus, and method may be implemented in other manners. For example, the described apparatus embodiments are illustrative examples. For example, the unit division may be a logical functional division and there may be other divisions in various other implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments of this application.

In addition, functional units in the embodiments of this application may be integrated into one processing unit, or each of the units may exist alone physically, or two or more units may be integrated into one unit. The integrated unit may be implemented in the form of hardware, or may be implemented in the form of a software functional unit.

In various implementations, the logical functions of the modules, units, and subunits may be performed on hardware including circuitry, circuits, and subcircuits, respectively.

In a case that the functions are implemented in a form of a software functional module and sold or used as an independent product, the functions may be stored in a computer-readable storage medium. Based on such an understanding, the technical solutions, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or a part of the operations of the methods described. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions. It is to be understood by persons of ordinary skill in the art that they may still make modifications to the technical solutions described in the foregoing embodiments or make equivalent replacements to some technical features thereof, without causing the essence of the corresponding technical solutions to depart from the spirit and description of the technical solutions.

What is claimed is:

1. A video image processing method, comprising:
    obtaining a first key point of an $M^{th}$ frame image in a video;
    performing weighted smoothing on the first key point of the $M^{th}$ frame image according to first key points in a historical key point queue and weights in a first target weight queue, to obtain a target key point, the historical key point queue comprising a first key point corresponding to each frame image in N frame images, the N frame images being images before the $M^{th}$ frame image, N>0, the weights in the first target weight queue corresponding to the first key points in the historical key point queue, a weight corresponding to a first key point of an $(M-a)^{th}$ frame image being greater than or equal to a weight corresponding to a first key point of an $(M-b)^{th}$ frame image, and a<b;
    adjusting the $M^{th}$ frame image according to the target key point by:
        determining whether a distance between the target key point and the first key point of the $M^{th}$ frame image is greater than a first preset value; and
        modifying a coordinate value corresponding to the first key point of the $M^{th}$ frame image to be a coordinate value corresponding to the target key point in a case that the distance is not greater than the first preset value; and
    updating the first target weight queue and performing the weighted smoothing and the adjusting in a case that the distance is greater than the first preset value.

2. The method according to claim 1, wherein the updating the first target weight queue comprises:
    subtracting an attenuation coefficient from each weight in the first weight queue, to obtain a second weight queue, so that each weight in the second weight queue is less than a second preset value; and
    using the second weight queue as an updated first target weight queue.

3. The method according to claim 1, wherein in a case that the distance is not greater than the first preset value, the method further comprises:
    adding a gain coefficient to a weight corresponding to a first key point of an $(M-1)^{th}$ frame image in the first target weight queue, to obtain a target weight, the target weight corresponding to the first key point of the $M^{th}$ frame image;
    deleting a weight corresponding to a first key point of an $(M-N)^{th}$ frame image from the first target weight queue and adding the target weight to the first target weight queue to obtain a second target weight queue in a case that the target weight is greater than or equal to 1; and
    subtracting the gain coefficient from each weight in the second target weight queue, to obtain a third target weight queue, the third target weight queue being configured to perform weighted smoothing on a first key point of an $(M+1)^{th}$ frame image.

4. The method according to claim 3, further comprising:
    deleting the weight corresponding to the first key point of the $(M-N)^{th}$ frame image from the first target weight queue and adding the target weight to the first target weight queue to obtain the second target weight queue in a case that the target weight is less than 1, the second target weight queue being configured to perform weighted smoothing on the first key point of the $(M+1)^{th}$ frame image.

5. The method according to claim 1, wherein the performing weighted smoothing on the first key point of the $M^{th}$ frame image according to first key points in a historical key point queue and weights in a first target weight queue, to obtain a target key point comprises:

performing weighted averaging on the first key point $p_{before}$ the $M^{th}$ frame image according to the following formula, to obtain a target key point $p_{after}$:

$$p_{after} = \frac{p_{before} + \sum_{j=1}^{N} w_j p_j}{1 + \sum_{j=1}^{N} w_j},$$

wherein N represents a length of the historical key point queue, $p_j$ represents a first key point of an $(M-j)^{th}$ frame image, and $w_j$ represents a weight corresponding to $p_j$.

6. The method according to claim 1, wherein the first key point comprises a human body posture key point or a human face key point.

7. A video image processing apparatus, comprising: a memory and a processor;
the memory being configured to store a program; and
the processor being configured to execute the program in the memory, comprising the following operations:
obtaining a first key point of an $M^{th}$ frame image in a video;
performing weighted smoothing on the first key point of the $M^{th}$ frame image according to first key points in a historical key point queue and weights in a first target weight queue, to obtain a target key point, the historical key point queue comprising a first key point corresponding to each frame image in N frame images, the N frame images being images before the $M^{th}$ frame image, N>0, the weights in the first target weight queue corresponding to the first key points in the historical key point queue, each weight in the first target weight queue being less than or equal to 1, a weight corresponding to a first key point of an $(M-a)^{th}$ frame image being greater than or equal to a weight corresponding to a first key point of an $(M-b)^{th}$ frame image, and a<b; and
adjusting the $M^{th}$ frame image according to the target key point by:
determining whether a distance between the target key point and the first key point of the $M^{th}$ frame image is greater than a first preset value; and
modifying a coordinate value corresponding to the first key point of the $M^{th}$ frame image to be a coordinate value corresponding to the target key point in a case that the distance is not greater than the first preset value; and
updating the first target weight queue and performing the weighted smoothing and the adjusting in a case that the distance is greater than the first preset value.

8. The apparatus according to claim 7, wherein the processor is further configured to perform the following operations:
subtracting an attenuation coefficient from each weight in the first weight queue, to obtain a second weight queue, so that each weight in the second weight queue is less than a second preset value; and
using the second weight queue as an updated first target weight queue.

9. The apparatus according claim 7, wherein in a case that the distance is not greater than the first preset value, the processor is further configured to perform the following operations:
adding a gain coefficient to a weight corresponding to a first key point of an $(M-1)^{th}$ frame image in the first target weight queue, to obtain a target weight, the target weight corresponding to the first key point of the $M^{th}$ frame image;
deleting a weight corresponding to a first key point of an $(M-N)^{th}$ frame image from the first target weight queue and adding the target weight to the first target weight queue to obtain a second target weight queue in a case that the target weight is greater than or equal to 1; and
subtracting the gain coefficient from each weight in the second target weight queue, to obtain a third target weight queue, the third target weight queue being configured to perform weighted smoothing on a first key point of an $(M+1)^{th}$ frame image.

10. The apparatus according to claim 9, wherein the processor is further configured to perform the following operation:
deleting the weight corresponding to the first key point of the (M-N)th frame image from the first target weight queue and adding the target weight to the first target weight queue to obtain the second target weight queue in a case that the target weight is less than 1, the second target weight queue being configured to perform weighted smoothing on the first key point of the $(M+1)^{th}$ frame image.

11. The apparatus according to claim 7, wherein the processor is further configured to perform the following operation:
performing weighted averaging on the first key point $p_{before}$ the $M^{th}$ frame image according to the following formula, to obtain a target key point $p_{after}$:

$$p_{after} = \frac{p_{before} + \sum_{j=1}^{N} w_j p_j}{1 + \sum_{j=1}^{N} w_j},$$

wherein N represents a length of the historical key point queue, $p_j$ represents a first key point of an $(M-j)^{th}$ frame image, and $w_j$ represents a weight corresponding to $p_j$.

12. Non-transitory computer-readable media configured to store instructions, the instructions configured to, when executed, cause a computer to perform the following operations:
obtaining a first key point of an $M^{th}$ frame image in a video;
performing weighted smoothing on the first key point of the $M^{th}$ frame image according to first key points in a historical key point queue and weights in a first target weight queue, to obtain a target key point, the historical key point queue comprising a first key point corresponding to each frame image in N frame images, the N frame images being images before the $M^{th}$ frame image, N>0, the weights in the first target weight queue corresponding to the first key points in the historical key point queue, each weight in the first target weight queue being less than or equal to 1, a weight corresponding to a first key point of an $(M-a)^{th}$ frame image being greater than or equal to a weight corresponding to a first key point of an $(M-b)^{th}$ frame image, and a<b;
determining whether a distance between the target key point and the first key point of the $M^{th}$ frame image is greater than a first preset value;
modifying a coordinate value corresponding to the first key point of the $M^{th}$ frame image to be a coordinate value corresponding to the target key point in a case that the distance is not greater than the first preset value;
updating the first target weight queue and performing the weighted smoothing and the adjusting in a case that the distance is greater than the first preset value; and
adjusting the $M^{th}$ frame image according to the target key point.

13. The computer-readable media according to claim 12, wherein the instructions are further configured to cause the computer to perform the following operations:
subtracting an attenuation coefficient from each weight in the first weight queue, to obtain a second weight queue, so that each weight in the second weight queue is less than a second preset value; and
using the second weight queue as an updated first target weight queue.

14. The computer-readable media according claim 12, wherein in a case that the distance is not greater than the first preset value, wherein the instructions are further configured to cause the computer to perform the following operations:
adding a gain coefficient to a weight corresponding to a first key point of an $(M-1)^{th}$ frame image in the first target weight queue, to obtain a target weight, the target weight corresponding to the first key point of the $M^{th}$ frame image;
deleting a weight corresponding to a first key point of an $(M-N)^{th}$ frame image from the first target weight queue and adding the target weight to the first target weight queue to obtain a second target weight queue in a case that the target weight is greater than or equal to 1; and
subtracting the gain coefficient from each weight in the second target weight queue, to obtain a third target weight queue, the third target weight queue being configured to perform weighted smoothing on a first key point of an $(M+1)^{th}$ frame image.

15. The computer-readable media according to claim 12, wherein the updating the first target weight queue comprises:
subtracting an attenuation coefficient from each weight in the first weight queue, to obtain a second weight queue, so that each weight in the second weight queue is less than a second preset value; and
using the second weight queue as an updated first target weight queue.

16. The computer-readable media according to claim 12, wherein the instructions are further configured to cause the computer to perform the following operations in a case that the distance is not greater than the first preset value:
adding a gain coefficient to a weight corresponding to a first key point of an $(M-1)^{th}$ frame image in the first target weight queue, to obtain a target weight, the target weight corresponding to the first key point of the $M^{th}$ frame image;
deleting a weight corresponding to a first key point of an $(M-N)^{th}$ frame image from the first target weight queue and adding the target weight to the first target weight queue to obtain a second target weight queue in a case that the target weight is greater than or equal to 1; and
subtracting the gain coefficient from each weight in the second target weight queue, to obtain a third target weight queue, the third target weight queue being configured to perform weighted smoothing on a first key point of an $(M+1)^{th}$ frame image.

\* \* \* \* \*